UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

MIXED CELLULOSE-ESTER COMPOSITION AND PROCESS OF MAKING THE SAME.

1,354,726.                Specification of Letters Patent.         Patented Oct. 5, 1920.

No Drawing.        Application filed January 2, 1920.  Serial No. 349,053.

*To all whom it may concern:*

Be it known that I, STEWART J. CARROLL, a citizen of the United States of America, residing at Rochester, in the county of Monroe and State of New York, have invented certain new and useful Improvements in Mixed Cellulose-Ester Compositions and Processes of Making the Same, of which the following is a full, clear, and exact specification.

This invention relates to a new mixed cellulose ester composition and process of making the same, in which a mixture of cellulose nitrate and cellulose acetate is combined or mixed with other substances, so that the resulting product can be advantageously used in the plastic and analogous arts, such, for instance, as sheet or film manufacture and varnish manufacture.

One object of my invention is to provide a composition of matter in which the relatively cheap but inflammable cellulose nitrate is combined with the more expensive but less inflammable cellulose acetate, together with certain additional ingredients which are prevented from crystallization or partial separation in the product. Another object of my invention is to provide a method of combining the ingredients homogeneously, so that in the resulting product they will stay permanently homogeneous. Still another purpose of my invention is to provide a composition in which the inflammability is very small. A further object is to produce a composition which may be made into permanently transparent, strong, and flexible sheets of film of desired thinness that are practically waterproof, are unaffected by ordinary photographic liquids, and possess the desired properties of a support for sensitized photographic coatings. Still another object is to produce a composition which is capable of easy manipulation in the film making or varnish making arts, which will not injure or be injured by the substances with which it is associated during manufacture, storage or use. Further objects will hereinafter appear.

It is well known that nitrocellulose compounds can be made into very strong, durable and transparent films, but the latter are relatively inflammable and so said films, when used in motion picture projectors, for instance, call for special precautions against fire. It is also well known that cellulose acetate compounds may be incorporated into excellent films of very small inflammability, but such films are somewhat more expensive than the cellulose nitrate product. I have found that a composition, combining the good qualities of the cellulose nitrate compounds and the cellulose acetate compounds and also having the desirable qualities hereinabove enumerated, including a minimum inflammability, can be obtained by mixing or compounding cellulose nitrate and cellulose acetate with crystalline or waxy higher chlorin derivatives of the cyclic hydrocarbons $C_{2n}H_{n+3}$ and their homologues, such as tri or tetra chlor naphthalenes or anthracenes. Furthermore this compounding is preferably performed by mixing the ingredients with a solvent common to both, such as acetone. If, however, the waxy body alone is thus compounded with the cellulose nitrate in serviceable amounts, it tends to separate out or crystallize on the surface of the varnish or film when the volatile common solvent evaporates, thus rendering it imperfect for some purposes, particularly impairing the transparency needed in the photographic art. I have discovered that this undesirable separation may be prevented by incorporating phenyl esters, like triphenyl phosphate and its derivatives and homologues into the compound along with the chlor body. Such phenyl esters are peculiarly desirable as fixers of the chlor body, because they not only retain such body in its amorphous or colloidized state, but, like it, also tend to decrease the combustibility of the resulting composition, being themselves substantially non-combustible. When flexibility should be emphasized, as in photographic film, I also may add substitutes like the aliphatic alcohols of more than two carbon atoms,—for instance, fusel oil or the various butyl alcohols which have only slight volatility. The use of these alcohols is particularly convenient where they have been associated with the undissolved nitrocellulose during prior manufacture and treatment of the same.

The waxy chlor bodies which I may employ are so substantially non-volatile that any loss under the conditions prevailing during the use and desired life of the film will not make the latter unserviceable. As applied to my compounds, the term "non-inflammable" means practical non-inflammability, the chlor bodies themselves not acting normally to propagate combustion but rather being strongly flame resisting. They impart this quality to a highly useful degree to the composition in which I incorporate them. The following substance may be mentioned as a typical example of the chlor body to which I refer. It is translucent and waxy with a somewhat crystalline appearance and consists of a mixture of higher chlorinated naphthalenes, chiefly tetra chlor naphthalenes, which mixture has a boiling range from 310° C. to 340° C. It is especially non-inflammable.

In carrying out one illustration of my invention, I incorporate with 30 parts of cellulose nitrate and 70 parts of cellulose acetate 475 parts of acetone, 30 parts of triphenyl phosphate, 12 parts of fusel oil and 5 parts of the waxy chlor body hereinabove mentioned in the preceding paragraph. As previously explained, the fusel oil is optional, but is decidedly preferable where enhanced flexibility is desired. In combining the ingredients, the cellulose nitrate, fusel oil and cellulose acetate are thoroughly mixed with the acetone while the waxy chlor body and the triphenyl phosphate are combined in a separate mixture by means of a small portion of acetone. This chlor body-triphenyl phosphate mixture is then thoroughly stirred into the previously formed cellulose nitrate-fusel oil-cellulose acetate mixture to form a homogeneous solution or flowable mass, which may be filtered if desired. The pre-mixing of the chlor body with the triphenyl phosphate not only facilitates the introduction of the latter into the mixture but the colloidizing of the ingredients, which takes places in this earlier stage, keeps the chlor body from later changing to the crystalline form and thus separating out.

This illustrative solution or composition is sufficiently viscous to be properly flowed during sheet or film manufacture, the acetone volatilizing readily, but not too fast to impair the product. The resulting film, containing the non-volatilized ingredients, is flexible, transparent, uniform and smooth, so that it may be used for any usual or preferred purpose. Due to its greatly reduced inflammability, fire risk is for all practical purposes eliminated. It is substantially waterproof and is unaffected by ordinary photographic chemicals. The chlor body having the halogen in the ring or closed chain is very stable, so that chlorin is not liberated in sufficient amounts to injure metal or other parts with which it comes in contact during manufacture and, moreover, does not chemically react with or injure other bodies that it is associated with in the solution or film, even when the latter is coated with sensitive emulsion.

While I have hereinabove given certain definite examples, my invention is, of course, not limited thereto, as my experiments indicate that the proportions may be widely varied from those given, in order to adapt the composition to particular uses. The proportions of nitrate and acetate may be greatly varied in accordance with the desirability of imparting the properties of one or the other of these esters to the composition in more or less degree. In the manufacture of photographic film, I at present consider it particularly useful when the amount of cellulose nitrate varies relatively to the amount of cellulose acetate, so that from 30 to 50 parts of the nitrate may be combined with 70 to 50 parts of the acetate. Of course, other volatile common solvents may be used in place of the acetone.

Having thus described my invention, what I claim as new and desire to secure by Letters Patent is:

1. A composition of matter comprising cellulose nitrate, cellulose acetate, a waxy higher chlorin derivative of the cyclic hydrocarbons $C_{2n}H_{n+3}$ and their homologues and a non-inflammable compound for preventing separation of said chlorin derivative.

2. A composition of matter comprising cellulose nitrate, cellulose acetate, a waxy higher chlorin derivative of the cyclic hydrocarbons $C_{2n}H_{n+3}$ and their homologues, a non-inflammable compound for preventing separation of said chlorin derivative and a common solvent.

3. A composition of matter comprising cellulose nitrate, cellulose acetate, a waxy higher chlorine derivative of the cyclic hydrocarbons $C_{2n}H_{n+3}$ and their homologues, a non-inflammable compound for preventing separation of said chlorin derivative and an organic body of slight volatility which enhances the flexibility of the composition.

4. A composition of matter comprising cellulose nitrate, cellulose acetate, tetra chlor naphthalene and a phenyl ester for keeping said tetra chlor naphthalene in the colloidized state.

5. A composition of matter comprising cellulose nitrate, cellulose acetate, tetra chlor naphthalene and triphenyl phosphate.

6. A composition of matter comprising cellulose nitrate, cellulose acetate, tetra chlor naphthalene, a phenyl ester for keeping said tetra chlor naphthalene in the colloidized state and an organic body of slight volatility which enhances the flexibility of the composition.

7. A composition of matter comprising cellulose nitrate, cellulose acetate, tetrachlor naphthalene, triphenyl phosphate and fusel oil.

8. A composition of matter comprising cellulose nitrate, cellulose acetate, tetra chlor naphthalene, a phenyl ester for keeping said tetra chlor naphthalene in the colloidized state and a common solvent.

9. A composition of matter comprising cellulose nitrate, cellulose acetate, tetra chlor naphthalene, triphenyl phosphate, fusel oil and acetone.

10. A composition of matter comprising cellulose nitrate 30 parts, cellulose acetate 70 parts, acetone 475 parts, fusel oil 12 parts, triphenyl phosphate 30 parts, and a waxy chlorinated body consisting chiefly of tetra chlor naphthalene and boiling from 310° C. to 340° C. 5 parts.

11. As an article of manufacture, a sheet of deposited or flowed cellulose nitrate and cellulose acetate containing a waxy higher chlorin derivative of the cyclic hydrocarbons $C_{2n}H_{n+3}$ and their homologues and a non-inflammable compound for preventing separation of said chlorin derivative.

12. As an article of manufacture, a sheet of deposited or flowed cellulose nitrate and cellulose acetate containing tetra chlor naphthalene and a phenyl ester for keeping said tetra chlor naphthalene in the colloidized state.

13. As an article of manufacture, a sheet of deposited or flowed cellulose nitrate and cellulose acetate containing tetra chlor naphthalene and triphenyl phosphate.

14. As an article of manufacture, a sheet of deposited or flowed cellulose nitrate and cellulose acetate containing tetra chlor naphthalene, triphenyl phosphate and fusel oil.

15. The process of making a composition of matter which comprises the step of combining tetra chlor naphthalene and triphenyl phosphate by the aid of a common solvent and then combining the resulting mixture with a solution containing cellulose nitrate and cellulose acetate.

16. The process of making a composition of matter which comprises first colloidizing tetra chlor naphthalene and triphenyl phosphate together and then combining the resulting mixture with a solution containing cellulose nitrate, cellulose acetate and fusel oil.

Signed at Rochester, New York, this 23rd day of December, 1919.

STEWART J. CARROLL.